United States Patent [19]

Meyer

[11] 4,049,137

[45] Sept. 20, 1977

[54] HAULING VEHICLE WITH SIDE DUMP BODY

[75] Inventor: Gustave Meyer, Northglenn, Colo.

[73] Assignee: Irvin L. Stumpf, Wheat Ridge, Colo. ; a part interest

[21] Appl. No.: 652,837

[22] Filed: Jan. 27, 1976

[51] Int. Cl.² .............................................. B60P 1/00
[52] U.S. Cl. ...................................... 214/82; 298/1 B
[58] Field of Search ............... 214/82, 17 D; 298/1 B, 298/1 R, 13, 18, 26, 12, 11; 222/502, 506, 508, 505

[56] References Cited

U.S. PATENT DOCUMENTS

| | | | |
|---|---|---|---|
| 2,471,874 | 5/1949 | Johns | 298/26 |
| 3,450,284 | 6/1969 | Diem | 214/82 |
| 3,616,950 | 11/1971 | Coons | 214/82 |
| 3,837,516 | 9/1974 | Meyer | 214/82 |
| 3,872,984 | 3/1975 | Moser et al. | 214/82 |

FOREIGN PATENT DOCUMENTS

| | | | |
|---|---|---|---|
| 505,502 | 12/1954 | Italy | 214/82 |
| 462,789 | 4/1951 | Italy | 214/82 |

*Primary Examiner*—Robert J. Spar
*Assistant Examiner*—Lawrence E. Williams
*Attorney, Agent, or Firm*—Bertha L. MacGregor; Kyle W. Rost

[57] ABSTRACT

A hauling vehicle with side dump body comprising stationary opposite end walls, first and second opposite sides, a bottom, and an exterior flap attached below said second side, wherein said first side and an adjacent portion of the bottom are hingedly connected to form an ejector inwardly pivotal to provide an interior ramp prompting contents of the body against said second side which is free swinging and openable in response to pressure from within the hauling body; said flap being upwardly pivotal to prevent said second side from opening in response to pressure within the body and downwardly pivotal into a ramp guiding contents exiting said second side away from the hauling body. Means activating the ejector and means activating the flap for latching and unlatching the flap are provided.

3 Claims, 3 Drawing Figures

HAULING VEHICLE WITH SIDE DUMP BODY

BACKGROUND OF THE INVENTION

This invention relates to hauling vehicles with side dump bodies adapted for use with trucks or other means for carrying the bodies. The side dump body is provided with ejector means and means for locking the free swinging side panel.

In the prior art applicant's U.S. Pat. No. 3,837,516 discloses a loader bucket designed for use in a front end loader or a backhoe loader, equipped with an ejector comprising two flat plates hingedly connected together and a mechanism for operating the ejector plates. Other side dump vehicle bodies are believed to exist, but neither these other vehicles nor applicant's prior loader bucket disclose the elements of the present invention.

SUMMARY OF THE INVENTION

The invention discloses a hauling body that may be mounted on a truck or earth mover, the body being distinctive in its ability to dump its contents from the side of the body rather than from the rear end as is common in the art. The dumping is accomplished by first activating means for unlocking the lower edge of one side of the hauling body and then activating means for ejecting the contents of the body. The contents are ejected through the unlocked and now free swinging side panel by the movement of the opposite side panel and a hingedly connected half floor panel which together form an interior ramp on which the contents slide against the free swinging side. Unlike the well known dump truck body, the frame of the present hauling body is not elevated at one end or side to accomplish the dumping action. The construction is such that the hauling body can be loaded and its contents discharged within restricted areas.

An object of the invention is to provide an exceptionally compact hauling body in which the ejector plates, in their retracted loading position, serve as a side wall of the hauling body and as a portion of the floor of the hauling body. Thus, the body structure is lightened without detracting from its efficiency for its intended purposes.

Another object of the invention is to provide ejector activating means carried by the hauling body which includes an hydraulic cylinder mounted pivotally on a wall of the body and a piston connected to the ejector plates hingedly connected together. The side wall ejector plate is hingedly connected to the side top frame of the hauling body in such relationship that the ejector as a whole, when retracted, is located entirely within the dimensions of the hauling body.

Another important object is to provide latching means for latching and unlatching the lower edge of the free swinging side, which includes a flap located under the free swinging side.

Another object of the invention is to provide means for activating the latching means carried by the hauling body which includes an hydraulic cylinder mounted pivotally on the lower wall of the hauling body and a piston connected to the flap of the latching means. The flap is hingedly connected below the free swinging side of the hauling body in such relationship that when the flap has been moved to cause the free swinging side to be unlatched, the flap extends downwardly and outwardly from the side of the hauling body having the free swinging side panel, and when the flap has been moved to a position to cause the free swinging side to be latched, the flap is in an approximately vertical position.

DESCRIPTION OF THE PREFERRED EMBODIMENT

Figure 2:
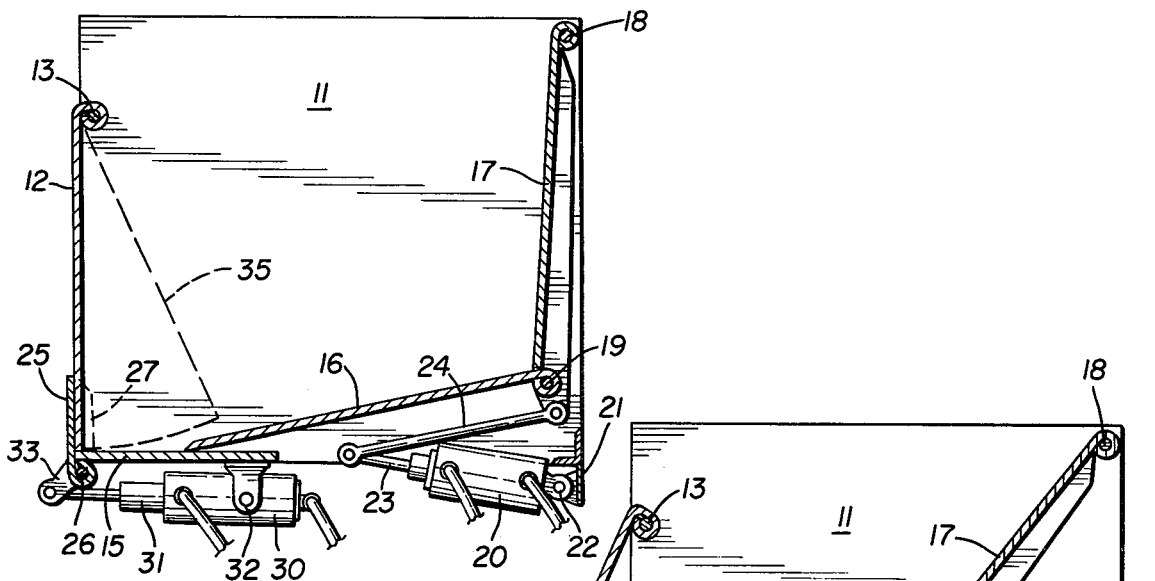
FIG. 2 is a transverse vertical sectional view in the plane of line 2—2 of FIG. 1, in partial elevation, showing the hauling body with the ejector retracted and the free swinging side and flap in latched position.

As shown in the drawings, the hauling body 10 has walls 11 located at opposite ends of the body. One of the sides of the body is closed by free swinging side panel 12, which is attached at its upper end to the hauling body by hinged connection 13 allowing side panel 12 to swing freely away from end walls 11 at its lower edge. When the side panel 12 is in closed position as seen in FIG. 2, it closes the entire side of the hauling body. Bottom wall 15 runs the length of the hauling body between the end walls 11 and is joined to them, but it extends only toward the center from free swinging side 12 and ends before reaching the opposite side of the hauling body, thereby covering only a portion of the total floor area of the body. The remainder of the floor area and the side opposite the free swinging side 12 are closed by ejector plates 16 and 17. Plate 16 extends substantially between end walls 11 and partially rests upon bottom 15, providing a floor for that area within the hauling body 10 not covered by bottom 15. Plate 17 provides a side wall opposite free swinging side 12 and is hingedly attached at its top end by fixed hinge 18. Plates 16 and 17 meet and are hinged together by hinge 19.

Figure 3:
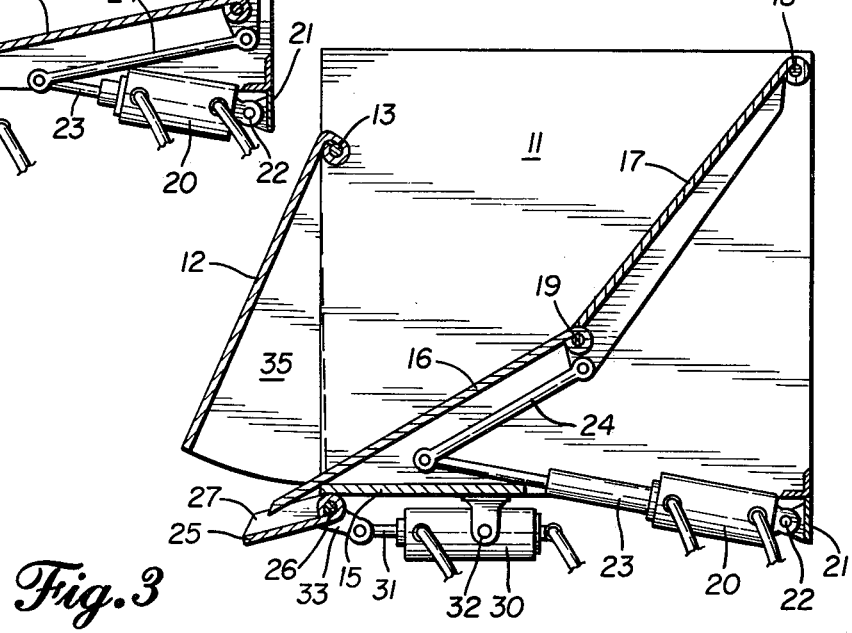
FIG. 3 is a view similar to FIG. 2 showing the ejector in dump position and the free swinging side and flap in unlatched configuration.

As seen in FIG. 2, the ejector plates 16 and 17 in their retracted position comprise one side wall and a portion of the bottom wall of the hauling body. The ejector is supplied with activating means causing the hinge 19 to be moved upwardly and inwardly while plate 17 swings on hinge 18 and plate 16 slides toward free swinging side 12 across bottom wall 15. As shown in FIG. 3, the ejector forms a ramp that prompts the contents of the hauling body to slide against free swinging side 12. The lower edge of ejector plate 16 in the dump position may move beyond the outside edge of bottom wall 15.

The activating means for bringing the ejector into the dump position may be an hydraulic cylinder 20 attached to the frame 21 of the hauling body in the recess provided under ejector plate 16. Cylinder 20 is attached by pivot mount 22 and has piston 23 which moves to cause the ejector to operate. The drawings show arm 24 as one means of attaching piston 23 to the ejector near hinge 19 in order to transmit the motion imparted to piston 23 by cylinder 20 to the ejector plates. The activating means both extends the ejector as seen in FIG. 3 and retracts the ejector as seen in FIG. 2. A single means for activating the ejector may be located near the center of the ejector, or when the size or load requires it, a plurality of activating means may be spaced at intervals along the length of the ejector.

The free swinging side panel 12 is ordinarily in the closed position shown in FIG. 2 when the ejector is retracted. Latching means are required to hold side panel 12 in closed position against the weight of a load in the hauling body. One suitable latching means shown in the drawings is flap 25 attached by hinge 26 to the hauling body. When the flap 25 is in the configuration shown in FIG. 2, it holds free swinging side 12 firmly in closed position and creates a secondary seal at the lower edge of the free swinging side, thereby helping to retain the contents of the hauling body. Flap 25 may have ends 27 that may pass outside end walls 11 in FIG. 2 and assist in retaining the contents of the hauling body. When the latching means are in unlatched position as seen in FIG. 3, flap 25 has pivoted on hinge 26 to clear the path for free swinging side 12 to open.

Figure 1:
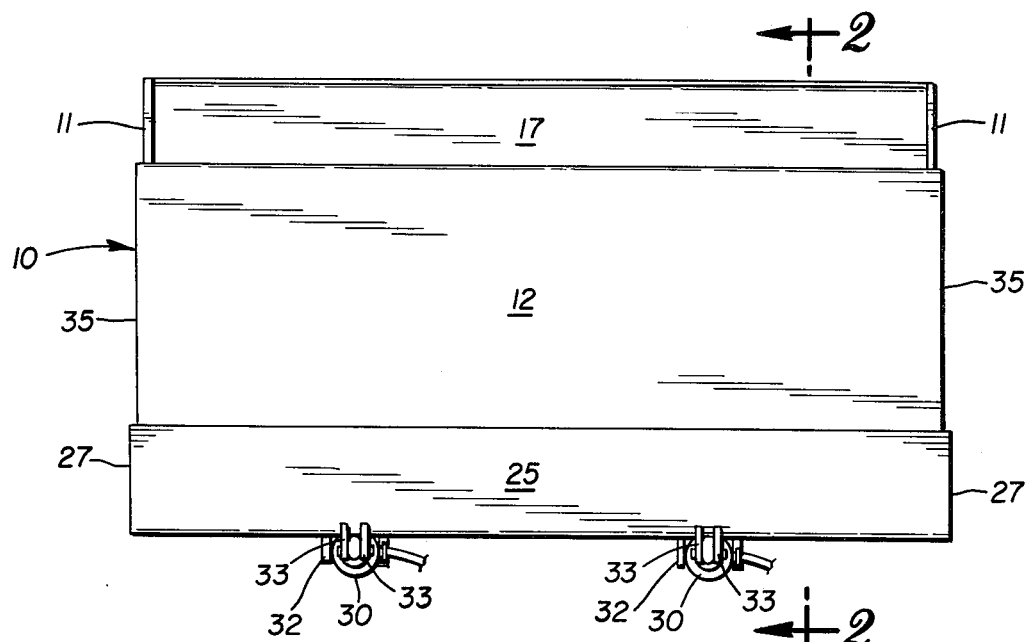
FIG. 1 is an elevational side view of the hauling body showing the free swinging side, the flap, and hydraulic cylinders.

Means for activating the latching means may comprise an hydraulic cylinder 30 pivotally mounted at 32 to the hauling body, for example on the lower side of bottom wall 15. Piston 31 moves to activate flap 25. The drawings show arm 33 as one means of attaching piston 31 to flap 25, to transmit the motion imparted to piston 31 by cylinder 30 to the flap. The activating means both folds the flap into latched position shown in FIG. 2 and unfolds the flap to unlatched position as shown in FIG. 3. A single means for activating the latching means may be used or when the size of the flap warrants it, a plurality of activating means may be spaced at intervals along the length of the flap, as suggested by the pair of cylinders 30 in FIG. 1. The activating means also serves as support holding flap 25 in unlatched position while the contents of the hauling body are being dumped. During the dumping operation, flap 25 protects the equipment attached under the hauling body, such as cylinders 20 and 30, from being harmed by contact with the material being ejected from side 12 and also serves as deflecting means causing the ejected material to fall away from the hauling body 10 and away from any carrier upon which the hauling body is mounted. This latter function is especially important in a side dump hauling body since forward motion of the body is not as effective for keeping the body and carrier free of entrenchment in the dumped contents as is forward motion of the conventional rear dump body. Free swinging side 12 may be equipped with side shields 35 which may fit immediately inside end walls 11 when side 12 is in closed position and swing with side 12 to form sides of a chute when the contents of the body are dumped. Side 12 with shields 35 may cooperate with flap 25 having ends 27 to guide contents being dumped into a narrow area and prevent side spillage.

The use of free swinging side 12 rather than a side opened by mechanical means has the advantage of allowing the dumping operation to occur without regard to the amount of available side room as long as the free swinging side could open a small amount. Thus, the operation of the ejector independently of the free swinging side 12 allows the body to dump its contents in highly confined areas. When flap 25 is held in latched position, the body has a relatively unobstructed side.

The semi-open bottom design of the body offers weight saving and also eliminates any problem with objects becoming jammed under or behind the ejector plates. An additional feature seen in the drawings is the uneven heights of the side walls. The side having free swinging panel 12 is somewhat shorter than the opposite side in order to facilitate loading the hauling body. The taller opposite side helps to prevent overspillage during loading from the shorter side. In addition, the ejector comprising the taller side is able to form a steeper angle when in dump position due to the higher mounting of hinge 18.

I claim:

1. An improved side dump hauling body, adapted for heavy duty, of the kind having a pair of stationary end walls running between first and second sides of the hauling body, a stationary bottom wall connecting the lower edges of the end walls and an ejector hingedly attached at its top edge at the top of the second side of the hauling body, and moveable from a retracted to an extended position, and wherein the improvement comprises:

a. a free swinging side panel hingedly attached at its top edge at the top of said first side of the hauling body and depending from said hinge in substantially vertical position for sealing said first side in cooperation with said first and second end walls and said stationary bottom wall, and being swingable outwardly from sealing position in response to pressure of the load carried within the body to open sufficiently for load discharge;

b. said ejector comprising a first ejector plate depending from said hinged attachment at the top of the second side of the hauling body and substantially closing said second side, and a second ejector plate having a hinge attaching a first edge to the lower edge of the first ejector plate, the second plate having a second edge opposite said first edge and supporting the second plate in slidable contact with said stationary bottom wall, the second ejector plate forming an acute angle between its lower side and the stationary bottom wall and having its second edge substantially spaced from the first side of the hauling body when the ejector is in retracted position, the spacing between the second ejector plate and the first side of the hauling body allowing a load within the hauling body to be partially supported on the stationary bottom wall and partially supported on the second ejector plate, the acute angle with the bottom wall allowing the second plate to initiate shifting of the load toward the free swinging side without the second plate having to lift the entire mass of the load, the second ejector plate sliding on its second edge over the stationary bottom wall to the first side of the hauling body during movement into extended position and sliding with the bottom face of the second ejector plate against the first side edge of the bottom wall when the second edge of the second ejector plate has extended outside the first side of the hauling body;

c. said hinged attachment at the top of the first ejector plate being at a relatively higher vertical position than the hinge at the top of the free swinging side, the relatively lower height of the free swinging side aiding loading of the hauling body by ground based loaders, and the relatively greater height of the second side of the hauling body allowing the ejector to extend in a steeper angle for load discharge and also allowing the first plate of the ejector to swing the hinged attachment between the two ejector plates along an arc of increased radius, during ejector extension initially moving said second ejector plate with a greater horizontal component for inducing shifting of a load toward the free swinging side without undue lifting of the load;

d. ejector activating means for swinging the ejector on said hinge at the top of the second side of the hauling body, moving the hinged connection between the two ejector plates toward the free swinging side during ejector extension, the connection between the activating means and the ejector allowing the two ejector plates to be moved beyond a single plane position when the ejector is fully extended; and e. latching means for holding the free swinging side panel in position sealing said first side of the hauling body when the load is to be retained in the hauling body, and being releasable independently of the operation of said ejector activating means in connection with load discharge.

2. The improved hauling body of claim 1, wherein said ejector activating means is a hydraulic cylinder mounted in an approximately horizontal position under said ejector and having a piston that extends approximately toward said free swinging side, the piston being connected by an arm to a point on the ejector that is offset from the hinge between the two ejector plates, the offset allowing the cylinder to move the plates into an extended position first forming a plane and then moving beyond a plane.

3. The improved hauling body of claim 1, wherein said stationary bottom wall is a partial wall extending from said first side of the hauling body to a point intermediate the second side of the hauling body and said second edge of the second ejector plate, the open bottomed area between the second side of the hauling body and the partial bottom wall allowing obstacles to proper ejector plate position to fall out of the hauling body.

* * * * *